(12) United States Patent
Geiger et al.

(10) Patent No.: US 7,512,539 B2
(45) Date of Patent: *Mar. 31, 2009

(54) METHOD AND DEVICE FOR PROCESSING TIME-DISCRETE AUDIO SAMPLED VALUES

(75) Inventors: Ralf Geiger, Wümbach (DE); Thomas Sporer, Fürth (DE); Karlheinz Brandenburg, Erlangen (DE); Jürgen Herre, Buckenhof (DE); Jürgen Koller, Wümbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 670 days.

This patent is subject to a terminal disclaimer.

(21) Appl. No.: 10/479,398

(22) PCT Filed: May 28, 2002

(86) PCT No.: PCT/EP02/05865

§ 371 (c)(1),
(2), (4) Date: Jun. 25, 2004

(87) PCT Pub. No.: WO02/103684

PCT Pub. Date: Dec. 27, 2002

(65) Prior Publication Data

US 2004/0220805 A1    Nov. 4, 2004

(30) Foreign Application Priority Data

Jun. 18, 2001    (DE)    ............................ 101 29 240

(51) Int. Cl.
*G06F 17/14* (2006.01)
*G10L 19/00* (2006.01)

(52) U.S. Cl. .................... 704/500; 704/501; 708/402

(58) Field of Classification Search .............. 704/200.1, 704/203, 204, 500, 501, 503; 382/244, 250; 708/402, 409
See application file for complete search history.

(56) References Cited

U.S. PATENT DOCUMENTS 5,748,786 A    5/1998    Zandi et al.

(Continued)

FOREIGN PATENT DOCUMENTS

JP    1990027752    10/1999

(Continued)

OTHER PUBLICATIONS

Zeng et al., "Integer Sinusoidal Transforms Based on Lifting Factorization", Proceeding IEEE International Conference on Acoustics, Speech, and Signal Processing, May 7-11, 2001, vol. 2, pp. 1181 to 1184.*

(Continued)

*Primary Examiner*—Martin Lerner
(74) *Attorney, Agent, or Firm*—Michael A. Glenn; Glenn Patent Group

(57) ABSTRACT

An integer transform, which provides integer output values, carries out the TDAC function of a MDCT in the time domain before the forward transform. In overlapping windows, this results in a Givens rotation which may be represented by lifting matrices, wherein time-discrete sampled values of an audio signal may at first be summed up on a pair-wise basis to build a vector so as to be sequentially provided with a lifting matrix. After each multiplication of a vector by a lifting matrix, a rounding step is carried out such that, on the output-side, only integers will result. By transforming the windowed integer sampled value with an integer transform, a spectral representation with integer spectral values may be obtained. The inverse mapping with an inverse rotation matrix and corresponding inverse lifting matrices results in an exact reconstruction.

25 Claims, 4 Drawing Sheets

U.S. PATENT DOCUMENTS

| | | | |
|---|---|---|---|
| 5,999,957 | A | 12/1999 | Ohta |
| 6,058,215 | A * | 5/2000 | Schwartz et al. ............ 382/244 |
| 6,073,153 | A * | 6/2000 | Malvar ....................... 708/400 |
| 6,119,080 | A * | 9/2000 | Liu et al. .................... 704/203 |
| 6,487,574 | B1 * | 11/2002 | Malvar ....................... 708/400 |
| 6,496,795 | B1 * | 12/2002 | Malvar ....................... 704/203 |
| 6,934,676 | B2 * | 8/2005 | Wang et al. ............. 704/200.1 |
| 7,275,036 | B2 * | 9/2007 | Geiger et al. .............. 704/500 |
| 7,315,822 | B2 * | 1/2008 | Li ............................... 704/500 |
| 7,343,287 | B2 * | 3/2008 | Geiger et al. .............. 704/230 |
| 7,437,394 | B2 * | 10/2008 | Hou ........................... 708/402 |
| 2005/0083216 | A1 * | 4/2005 | Li ............................... 341/50 |
| 2005/0114126 | A1 * | 5/2005 | Geiger et al. .............. 704/230 |

FOREIGN PATENT DOCUMENTS

| | | |
|---|---|---|
| JP | 1999008665 | 7/2000 |
| JP | 200177697 A | 10/2001 |
| JP | 20010077697 | 10/2001 |

OTHER PUBLICATIONS

Zeng et al., "Integer DCTs and Fast Algorithms", IEEE Transactions on Signal Processing, vol. 49, No. 11, Nov. 2001, pp. 2774 to 2782.*

Geiger, Ralf et al.; Audio Coding based on Integer Transforms; Sep. 21-24, 2001; New York, NY, USA.

Noll Peter; Wideband Speech and Audio Coding; Nov. 31, 1993; IEEE Communications, New York, NY, USA.

Pei, Soon-Chang; the Integer Transforms Analogous to Discrete Trigonometric Transforms; Dec. 2000; IEEE Transactions.

Zeng, Yonghong, et al.; Integer Sinusoidal Transforms Based on Lifting Factorization; 2001; IEEE.

Ralf Geiger, Juergen Herre, Juergen Koller, Karlheinz Brandenburg;INTMDCT-A Link Between Perceptual and Lossless Audio Coding; Fraunhofer AEMT, Ilmenau, Germany; Fraunhofer IIS-A, Erlangen, Germany; Ilmenau Technical University, Ilmenau, Germany; 2002.

Ralf Geiger, Juergen Herre, Gerald Schuller, Thomas Sporer; Fine Grain Scalable Perceptual and Lossless Audio Coding Based on INTMDCT; Fraunhofer AEMT, Ilmenau, Germany; Fraunhofer IIS-A, Erlangen, Germany; 2002.

* cited by examiner

Prior Art

METHOD AND DEVICE FOR PROCESSING TIME-DISCRETE AUDIO SAMPLED VALUES

FIELD OF THE INVENTION

The present invention relates to audio-encoding and, in particular, to methods and apparatus for processing time-discrete audio sampled values so as to obtain integer output values.

DESCRIPTION OF THE RELATED ART

Up to date audio-encoding methods, such as e.g. MPEG layer 3 (MP3) or MPEG AAC, use transforms, such as for example the so-called modified discrete cosine transform (MDCT), so as to obtain a block-wise frequency representation of an audio signal. Such an audio-encoder usually obtains a current from time-discrete audio sampled values. The current from audio sampled values is windowed so as to obtain a windowed block of for example 1024 or 2048 windowed audio sampled values. For windowing, various window functions are used, such as, for example, a sine window, etc.

The windowed time-discrete audio sampled values will then be implemented in a spectral representation by means of a filterbank. In principle, a Fourier transform or, for special reasons, a variety of said Fourier-transforms, such as for example an FFT or, as has been executed, an MDCT may be used. The block of audiospectral values at the output of the filterbank may then be subjected to further processing as required. With the above-specified audio-encoders, a quantizing of the audio spectral values follows, with the quantizing stages being typically selected such that the quantizing noise, which is introduced by means of quantizing, ranges below the psychoacoustic masking threshold, i.e. is "masked away". Quantizing represents a lossy encoding. In order to obtain a further data amount reduction, the quantized spectral value will then be subjected to an entropy-encoding by means of a Huffman-encoding. By adding page information, such as for example scale factors etc., a bit current, which may be stored or transferred, is formed from the entropy-encoded quantized spectral values by means of a bit current multiplexer.

In the audio decoder, the bit current is organized into coded quantized spectral values and page information by means of a bit current demultiplexer. The entropy-encoded quantized spectral values are first entropy-encoded, so as to obtain the quantized spectral values. The quantized spectral values will then be inversely quantized, so as to obtain decoded spectral values comprising quantizing noise, which, however, ranges below the psychoacoustic masking threshold and will therefore not be heard. These spectral values will then be implemented in a time representation by means of a synthesis filterbank, so as to obtain time-discrete decoded audio sampled values. In the synthesis filterbank a transform algorithm inverse to the transform algorithm has to be employed. Moreover, after the frequency-time retransform, windowing has to be cancelled.

In order to obtain a good frequency selectivity, an up-to-date audio-encoder typically uses block overlapping. Such a case is represented in FIG. 4a. At first, for example, 2048 time-discrete audio sampled values are taken and windowed by means of a means 402. The window, which embodies the means 402, has a window length of 2N sampled values and provides a block of 2N windowed sampled values at its output-side. In order to obtain a window overlapping, a second block of 2N windowed sampled values is formed by means of a means represented from the means 402 in FIG. 4a. The 2048 sampled values fed into the means 404, however, are not the time-discrete audio sampled values to be immediately connected to the first window, but include the second half of the sampled values windowed by the means 402 and additionally include only 1024 new sampled values. In FIG. 4a, the overlapping is symbolically represented by a means 406, which causes a degree of overlapping of 50%. Both the 2N windowed sampled values output by the means 402 and the 2N windowed sampled values output by the means 404 will then be subjected to the MDCT algorithm by means 408 and/or 410. The means 408 provides N spectral values in accordance with the prior art MDCT algorithm for the first window, while the means 410 also provides N spectral values, however, for the second window, with an overlapping of 50% existing between the first window and the second window.

In the decoder, the N spectral values of the first window, as is shown in FIG. 4b, will be fed to a means 412, which carries out an inverse modified discrete cosine transform. The same applies to the N spectral values of the second window. The same will be fed to a means 414, which allows carries out an inverse modified discrete cosine transform. Both the means 412 and the means 414 provide 2N sampled values each for the first window and/or 2N sampled values for the second window.

In a means 416, which is referred to as TDAC (TDAC=time domain aliasing cancellation) in FIG. 4b, considers the fact that the two windows are overlapping. In particular, a sampled value $y_1$ of the second half of the first window, i.e. with an index N+k, is summed with a sampled value $y_2$ from the first half of the second window, i.e. with an index k, such that, at the output-side, i.e. in the decoder, N decoded time sampled values will result.

It should be appreciated, that by means of the function of means 416, which may also be referred to as an add function, the windowing carried out in the encoder schematically represented by FIG. 4a is automatically considered, such that in the decoder represented by FIG. 4b, no explicit "inverse windowing" has to take place.

If the window function implemented by the means 402 or 404 is designated with w(k), with the index k representing the time index, the condition has to be fulfilled that the squared window weight w(k) added to the squared window weight w(N+k) leads to a square of unity, with k ranging from 0 to N−1. If a sine window is used, the window weightings of which follow the first half wave of the sine function, this condition is always fulfilled, since the square of the sine and the square of the cosine always result in the value 1 for each angle.

A disadvantage of the window method described in FIG. 4a with a subsequent MDCT function is the fact that the windowing is achieved by a multiplication of time-discrete sampling values with a floating-point number, when a sine window is used, since the sine of an angle between 0 and 180°, apart from the angle of 90°, does not result in an integer value. Even if integer time-discrete sampled values are windowed, this will not result in any floating-point numbers of the windowing.

Therefore, even if no psychoacoustic encoder is used, i.e. if no lossless encoding is to be achieved, a quantizing is necessary at the output of the means 408 and/or 410 so as to be able to carry out a clear entropy-encoded process.

If, therefore, known transforms, as have been operated by means of FIG. 4a, should by employed for a lossless audio-encoding, either a very fine quantizing has to be employed in order to be able to neglect the resulting error on the basis of the rounding of the floating-point numbers or the error signal has to be additionally encoded, for example in the time domain.

Further, digital signal processors usually have an accumulator having a greater word length than the usually operator length so as to avoid too many rounding operations. The use of fast algorithms for the implementation of a filterbank typically results in the need to store intermediate results, which are to be used in later steps. The intermediate results have to be rounded to the operator accuracy and have to be broken into memory operations. Typically, the rounding errors accumulate over several processing steps. If it is further considered that most floating-point DSPs have word lengths of 32 bit with a mantissa of only 24 bit, it is obvious what is happening to input signals having an accuracy of 24 bit.

Both a too fine quantizing and the additional encoding of the error signal as an alternative result in an encoder having an increased computing complexity and increased complexity and, thus, in a correspondingly complex decoder. In particular, the decoder, which, thinking of the distribution of music, for example, via the internet, is a mass product, has to be a low-cost product owing to this fact so as to be superior as against other encoders on the market. With respect to this requirement using a very fine quantizing or encoding an additional error signal is often not compatible, since the additional cost result in higher decoder costs.

From the aspect of an encoder on the highly competitive market for audio-encoders it is at the same time often not tolerable to generate great data amounts. Expressed in other words, it is of essential meaning to achieve an as high compression factor as possible, since there often exist bandwidth-limited networks which result in a too weakly compressed audio-piece having a too great transmission duration over such a network, which will immediately result in the customer picking a different product with higher data compression and thus less transmission time.

SUMMARY OF THE INVENTION

It is the object of the present invention to provide an encoder/decoder concept, which is suitable for the lossless encoding and at the same time provides a high data compression in view of tolerable complexity.

In accordance with a first aspect of the invention, this object is achieved by a method for processing time-discrete sampled values representing an audio signal so as to obtain integer values, comprising the following steps windowing the time-discrete sampled values with a window with a length corresponding to 2N time-discrete sampled values so as to provide windowed time-discrete sampled values for a conversion of the time-discrete sampled values in a spectral representation by means of a transform which may generate N output values from N input values, with the windowing comprising the following sub-steps: selecting a time-discrete sampled value from a quarter of the window and a time-discrete sampled value from another quarter of the window so as to obtain a vector of time-discrete sampled values; applying a square rotation matrix to the vector, the dimension of which coincides with the rotation matrix being adapted to be represented by a plurality of lifting matrices, with one lifting matrix only comprising one element which depends on the window and is unequal to 1 or 0, with the sub-step of applying comprising the following sub-steps: multiplying the vector by a lifting matrix so as to obtain a first result vector; rounding a component of the first result vector with a rounding function mapping a real number onto an integer number so as to obtain a rounded first result vector; sequentially carrying out the steps of multiplying and rounding with another lifting matrix until all lifting matrices have been processed so as to obtain a rotated vector comprising an integer windowed sampled value from the quarter of the window and an integer windowed sampled value from the other quarter of the window.

In accordance with a second aspect of the invention, this object is achieved by an apparatus for processing time-discrete sampled values representing an audio signal so as to obtain integer values, comprising: means for windowing the time-discrete sampled values with a window (w) having a length corresponding to two 2N time-discrete sampled values so as to provide windowed time-discrete sampled values for a conversion of the time-discrete sampled values in a spectral representation by means of a transform which may generate N output values from N input values, with the means for windowing comprising the following sub-features: means for selecting a time-discrete sampled value from a quarter of the window and a time-discrete sampled value from another quarter of the window so as to obtain a vector of time-discrete sampled values; means for applying a square rotation matrix to the vector, the dimension of which coincides with the dimension of the vector, with the rotation matrix being adjusted to be represented by a plurality of lifting matrices, with one lifting matrix only comprising one element which depends on the window (w) and is unequal to 1 or 0, with a means for applying comprising the following sub-features: means for multiplying the vector by a lifting matrix so as to obtain a first result vector; means for rounding a component of the first result vector with a rounding function (r) mapping a real number to an integer number so as to obtain a rounded first result vector; and means for sequentially carrying out the steps of multiplying and rounding with another lifting matrix until all lifting matrices have been processed so as to obtain a rotated vector comprising an integer windowed sampled value from the quarter of the window and an integer windowed sampled value from another quarter of the window.

In accordance with a third aspect of the invention, this aspect is achieved by a method for inverse processing of integer values having been generated from time-discrete sampled values representing an audio signal, by windowing the time-discrete sampled values with a window with a length corresponding to 2N time-discrete sampled values so as to provide windowed time-discrete sampled values for a conversion of the time-discrete sampled values in a spectral representation by means of a transform which may generate N output values from N input values, with the windowing comprising the following sub-steps: selecting a time-discrete sampled value from a quarter of the window and a time-discrete sampled value from another quarter of the window so as to obtain a vector of time-discrete sampled values; applying a square rotation matrix to the vector, the dimension of which coincides with the dimension of the vector, with the rotation matrix being adapted to be represented by a plurality of lifting matrices, with one lifting matrix only comprising one element which depends on the window and is unequal to 1 or 0, with the sub-step of applying comprising the following sub-steps: multiplying the vector by a lifting matrix so as to obtain a first result vector; rounding a component of the first result vector with a rounding function mapping a real number onto an integer number so as to obtain a rounded first result vector; sequentially carrying out the steps of multiplying and rounding with another lifting matrix until all lifting matrices have been processed so as to obtain a rotated vector comprising an integer windowed sampled value from the quarter of the window and an integer windowed sampled value from the other quarter of the window, comprising the following steps: applying the rotated vector with a rotation matrix inverse to the rotation matrix, with the inverse rotation matrix being adjusted to be represented by a plurality of inverse lifting matrices, with an inverse lifting matrix only comprising one element depending on the window and being unequal to 1 or 0, with the step of applying comprising the following sub-steps: multiplying the rotated vector with an inverse lifting matrix being inverse to the lifting matrix which has been used when generating the integer values so as to obtain a first inverse result vector; rounding a component of the first inverse result vector with the rounding function so as to obtain a rounded first inverse result vector; and sequentially carrying out the steps of multiplying and rounding with further lifting matrices in an order which is inversed with respect to the order when generating the integer values so as to obtain an inversely processed vector which includes an integer time-discrete sampled value from a quarter of the window and an integer time-discrete sampled value from another quarter of the window.

In accordance with a fourth aspect of the invention, this aspect is achieved by an apparatus for inverse processing of integer values having been generated from time-discrete sampled values representing an audio signal, by windowing the time-discrete sampled values with a window with a length corresponding to 2N time-discrete sampled values so as to provide windowed time-discrete sampled values for a conversion of the time-discrete sampled values in a spectral representation by means of a transform which may generate N output values from N input values, with the windowing comprising the following sub-steps: selecting a time-discrete sampled value from a quarter of the window and a time-discrete sampled value from another quarter of the window so as to obtain a vector of time-discrete sampled values; applying a square rotation matrix to the vector, the dimension of which coincides with the dimension of the vector, with the rotation matrix being adapted to be represented by a plurality of lifting matrices, with one lifting matrix only comprising one element which depends on the window and is unequal to 1 or 0, with the sub-step of applying comprising the following sub-steps: multiplying the vector by a lifting matrix so as to obtain a first result vector; rounding a component of the first result vector with a rounding function mapping a real number onto an integer number so as to obtain a rounded first result vector; sequentially carrying out the steps of multiplying and rounding with another lifting matrix until all lifting matrices have been processed so as to obtain a rotated vector comprising an integer windowed sampled value from the quarter of the window and an integer windowed sampled value from the other quarter of the window, comprising: means for applying the rotated vector with a rotation matrix inverse to the rotation matrix, with the inverse rotation matrix being adjusted to be represented by a plurality of inverse lifting matrices, with one inverse lifting matrix only comprising one element depending on the window and being unequal to 1 or 0, with the means for applying comprising the following sub-features: means for multiplying the rotated vector by an inverse lifting matrix being inverse to the lifting matrix which has been lastly used when generating the integer values so as to obtain a first inverse result vector; means for rounding a component of the first inverse result vector with the rounding function so as to obtain a rounded first inverse result vector; and means for sequentially carrying out the multiplying and rounding with further lifting matrices in an order which is inverse with respect to the order when generating the integer values so as to obtain an inversely processed vector which includes an integer time-discrete sampled value from a quarter of the window and an integer time-discrete sampled value from another quarter of the window.

The present invention is based on the recognition that the arising of floating-point values in the step of windowing may be prevented by carrying out the DTAC operation explicitly in the time range, i.e. prior to the execution of a transform. This will be achieved by considering the overlapping already before the transform, as is in contrast to the state of the art, and by processing two time-discrete sampled values from different quarters of a window. The processing will take place by applying a rotation matrix to the vector of the two time-discrete sampled values from different quarters of the window, with the rotation matrix being adapted to be represented by a plurality of so-called lifting matrices. As is known, the lifting matrices are characterized in that they only have one element, which is unequal to "0" or "1", i.e. which is non-integer. By sequentially carrying out a multiplication of a lifting matrix with the vector of time-discrete sampled values and subsequent rounding of the components of the vector, which is non-integer, the floating-point number will be equally rounded immediately after their generation. It should be appreciated, that, owing to the described property of the lifting matrices, only one component of the result vector of multiplication has to be rounded.

Preferably, the rotation matrix is a Givens rotation matrix, which, as is known, may be represented by three lifting matrices. The rotary angle of the Givens rotation matrix depends on the window function. It should be appreciated that, for the inventive method, all window functions are allowable, as long as these window functions fulfill the described condition that the square of a window weight and the square of a window weight which is away from the same by N window weights always result in the value 1. It should be appreciated that this condition may also be fulfilled by two subsequent windows of varying shape, such as, for example, a sine window and a Kaiser-Bessel window.

In a preferred embodiment of the present invention, the MDCT processing with a 50% overlapping is replaced by lifting matrices and roundings and a subsequent discrete cosine transform (DCT) with a non-symmetric basis function, i. e. by a DCT of the type IV.

In order to achieve not only an integer windowing, but also an integer discrete cosine transform, it is preferred to replace also the DCT transform by a Givens rotation, and, in particular, by processing with lifting matrices and a rounding after each lifting matrix multiplication.

An advantage of the present invention consists in that now only either during windowing or when completely transforming the offset values, the window sampled values or the spectral values remain as integers. Yet, the whole process is reversible by simply using the inverse rotation in a reverse order with respect to the processing of the lifting matrices and using the same rounding function. The inventive concept is thus suitable as an integer approximation of the MDCT with a perfect reconstructability, and, thus, represents an integer modified discrete cosine transform (INT MDCT).

The inventive concept still has the favorable properties of the MDCT, i.e. an overlapping structure, which provides a better frequency selectivity as the non-overlapping block transform, and a critical sampling, such that the total number of spectral values representing an audio signal do not exceed the number of input sampled values. Thus, owing to the roundings in the rotation steps, non-linearities will be introduced. The roundings, however, at the same time result in the number area of the integer spectral values not essentially exceeding the number area of the input values. While due to the overlapping structure, there is no energy conservation on a block-by-block basis, as it is given by the Parseval theorem, the inventive integer MDCT distinguishes itself in that the centre energy per block is maintained, since, preferably, only rounded Givens rotations are employed, which are generally energy-conserving.

An advantage of the present invention further consists in that, owing to the fact that integer output values are present, a subsequent quantizing may be forgone, such that the output values of the integer MDCT may be immediately entropy-encoded to obtain a lossless data compressor.

BRIEF DESCRIPTION OF THE DRAWINGS:

Preferred embodiments of the present invention will be explained in detail below with reference to the attached drawings, in which:

FIG. 4b shows a block diagram of a prior art decoder for decoding the values generated by FIG. 4a.

DETAILED DESCRIPTION OF THE PREFERRED EMBODIMENTS

Figure 1:
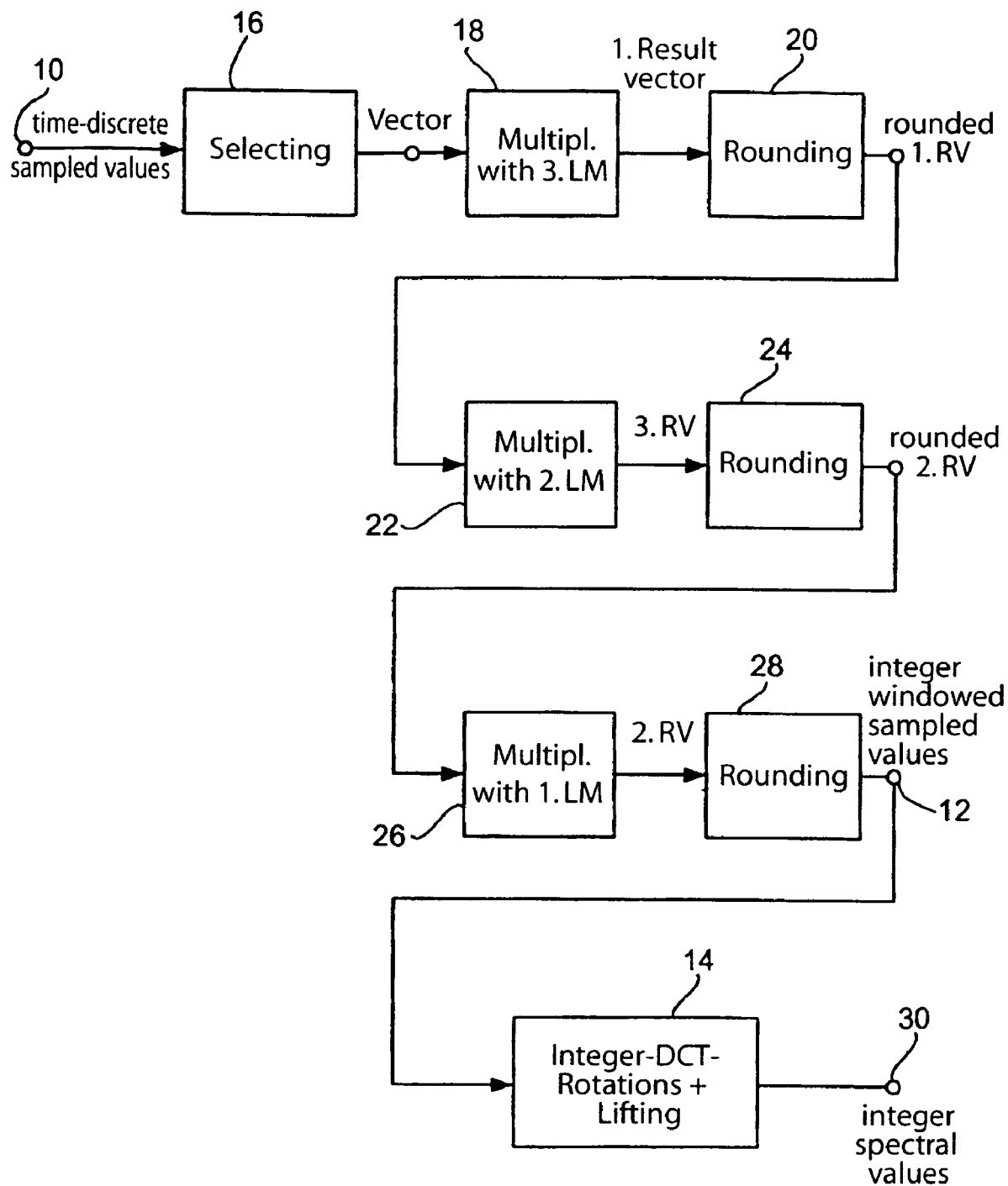
FIG. 1 shows a block diagram of an inventive apparatus for processing time-discrete audio sampled values to obtain integer values.
Figure 4A:
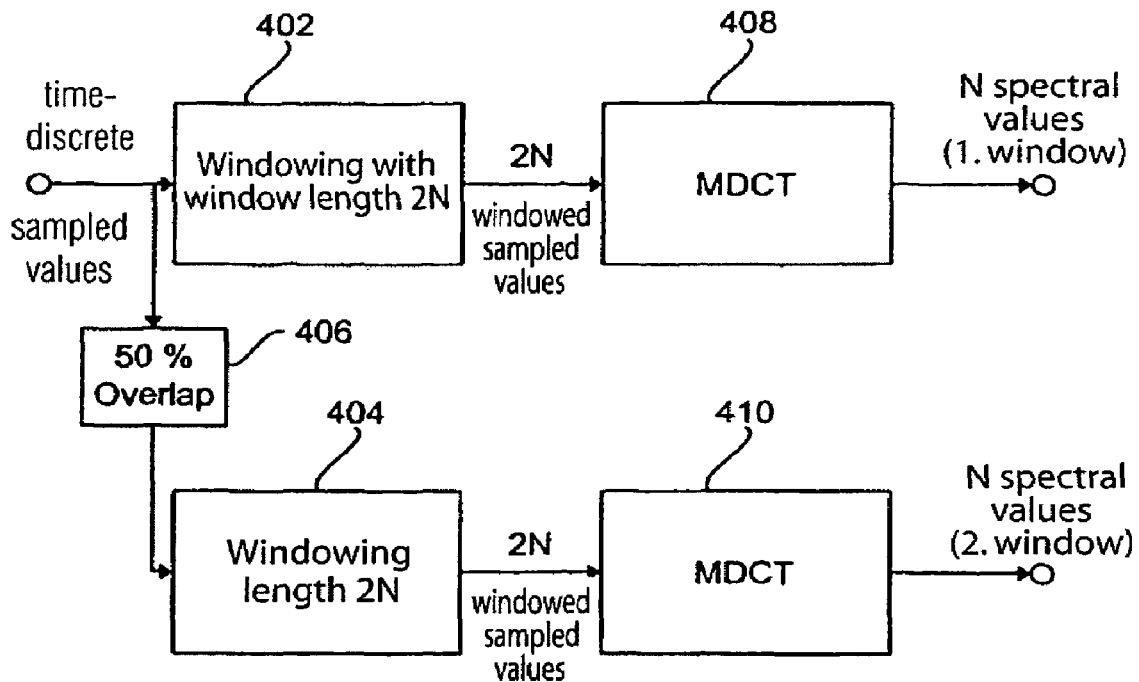
FIG. 4a shows a schematic block circuit diagram of a prior art encoder with MDCT and 50% overlapping.
Figure 4B:
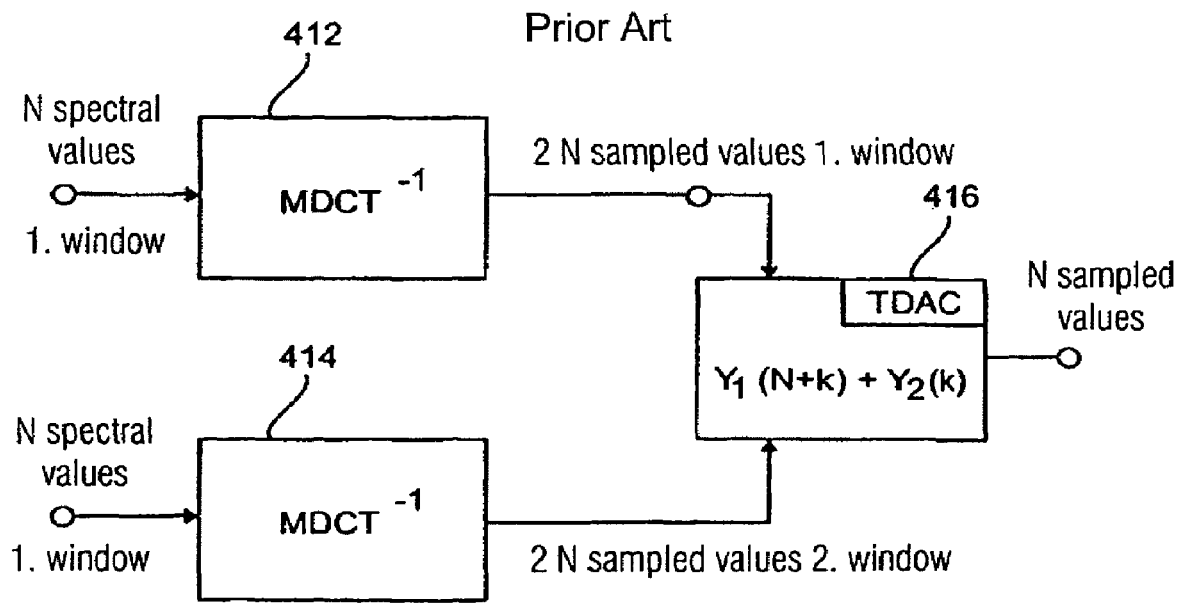

FIG. 1 shows an overview diagram for the inventive apparatus and/or the inventive method for processing time-discrete sampled values, which represent an audio signal, so as to obtain integer values. The time-discrete sampled values are windowed by the apparatus shown in FIG. 1 and optionally implemented in a spectral representation. The time-discrete sampled values, which are fed into the apparatus at an input 10, will be windowed with a window w with a length corresponding to 2 N time-discrete sampled values so as to achieve integer windowed sampled values at the output 12 which are suitable to be implemented into a spectral representation by means of a transform, and, in particular, by means of the means 14 for performing an integer DCT. The integer DCT is implemented to generate N output values from N input values, which is in contrast to the MDCT function 408 from FIG. 4a, which, owing to the MDCT equation, only generates N spectral values from 2 N windowed sampled values.

For windowing the time-discrete sampled values, two time-discrete sampled values are first selected in the means 16 which together represent a vector of time-discrete sampled values. A time-discrete sampled value, which is selected by the means 16, results in the first quarter of the window. The other time-discrete sampled value results in the second quarter of the window, as will be set forth in more detail from FIG. 3. A rotation matrix of the dimension 2×2 is applied to the vector generated by means 16, with this operation not being carried out immediately, but by means of several so-called lifting matrices.

A lifting matrix has the property that it only comprises one element which depends on the window w and is unequal to "1" or "0".

The factorization of wavelet transform in lifting steps is represented in the technical publication "Factoring Wavelet Transforms Into Lifting Steps", Ingrid Daubechies and Wim Sweldens, Preprint, Bell Laboratories, Lucent Technologies, 1996. Generally, a lifting scheme is a simple relation between perfectly reconstructing filter pairs which comprise the same low-pass or high-pass filter. Each pair of complementary filters may be factorized in lifting steps. In particular, this applies to the Givens rotations. Consider the case in which the poly-phase matrix is a Givens rotation. Then, the following equation is valid:

$$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix}$$

Each of the three lifting matrices to the right of the equalization sign have the value "1" as main diagonal elements. Further, in each lifting matrix, a subsidiary diagonal element equals 0, and a subsidiary diagonal element is dependent on the rotary angle α.

The vector will now be multiplied with the third lifting matrix, i.e. the lifting matrix to the very right in the above equation so as to obtain a first result vector. This is represented by a means 18 in FIG. 1. In accordance with the invention, the first result vector will now be rounded with any rounding function mapping the amount of the real numbers in the amount of the integer numbers, as is represented in FIG. 1 by a means 20. At the output of the means 20 a rounded first result vector is obtained. The rounded first result vector is now fed into a means 22 for multiplying the same by the middle, i.e. second, lifting matrix so as to obtain a second result vector which is again rounded in a means 24 so as to obtain a rounded second result vector. The rounded second result vector is now fed into a means 26, i.e. for multiplying the same by the lifting matrix set forth on the left side in the above equation, i.e. by the first lifting matrix, so as to obtain a third result vector, which is finally rounded once more by means of a means 28 so as to finally obtain integer window sampled values at the output 12, which now have to be processed by the means 14, if a spectral representation of the same is desired so as to obtain integer spectral values at a spectral output 30.

Preferably the means 14 is implemented as an integer DCT or integer DCT.

The discrete cosine transform in accordance with type 4 (DCT-IV) having a length N is given by the following equation:

$$X_l(m) = \sqrt{\frac{2}{N}} \sum_{k=0}^{N-1} x(k) \cos\left(\frac{\pi}{4N}(2k+1)(2m+1)\right)$$

The coefficients of the DCT-IV form an orthonormal N×N matrix. Each orthogonal N×N matrix may be decomposed in N (N−1)/2 Givens rotation, as is set forth in the technical publication P. P. Vaidyanathan, "Multirate Systems And Filter Banks", Prentice Hall, Englewood Cliffs, 1993. It should be appreciated that further decompositions also exist.

With respect to the classifications of the various DCT algorithms, reference should be made to H. S. Malvar, "Signal Processing With Lapped Transforms", Artech House, 1992. Generally, the DCT algorithms distinguish themselves by the type of their basis function. While the DCT-IV, which is preferred in the present invention, includes non-symmetric basis functions, i.e. a cosine quarter wave, a cosine ¾ wave, a cosine 5/4 wave, a cosine 7/4 wave, etc., the discrete cosine transform, for example, of the type II (DCT-II), has axis symmetric and point symmetric basis functions. The $0^{th}$ basis function has a direct component, the first basis function is a half cosine wave, the second basis function is a whole cosine wave, and so on. Owing to the fact that DCT-II especially considers the direct component, the same is used in video-encoding, but not in audio-encoding, since, in audio-encoding, in contrast to video-encoding, the direct component is not relevant.

In the following special reference is made to as how the rotary angle α of the Givens rotation depends on the window function.

An MDCT with a window length of 2 N may be reduced into a discrete cosine transform of type IV with a length N. This is achieved by explicitly carrying out the TDAC transform in the time domain and then applying the DCT-IV. In a 50% overlapping the left half of the window for a block t overlaps the right half of the preceding block, i.e. the block t−1. The overlapping part of two successive blocks t−1 and t will be preprocessed in a time domain, i.e. prior to the transform, as follows, i.e. is processed between the input 10 and the output 12 from FIG. 1:

$$\begin{pmatrix} \tilde{x}_t(k) \\ \tilde{x}_{t-1}(N-1-k) \end{pmatrix} = \begin{pmatrix} w\left(\frac{N}{2}+k\right) & -w\left(\frac{N}{2}-1-k\right) \\ w\left(\frac{N}{2}-1-k\right) & w\left(\frac{N}{2}+k\right) \end{pmatrix} \begin{pmatrix} x_t\left(\frac{N}{2}+k\right) \\ x_t\left(\frac{N}{2}-1-k\right) \end{pmatrix}$$

The values designated with a tilde comprise those values at the output 12 from FIG. 1, while the x values designated in the above equation without any tilde comprise those values at the input 10 and/or behind the means 16 which are to be selected. The running index k runs from 0 to N/2−1, while w represents the window function.

From the TDAC condition for the window function w, the following context is valid:

$$w\left(\frac{N}{2}+k\right)^2 + w\left(\frac{N}{2}-1-k\right)^2 = 1$$

For certain angles $\alpha_k$, k=0, . . . , N/2−1, this preprocessing in the time domain may be written as a Givens rotation, as has been set forth.

The angle α of the Givens rotation depends on the window function w as follows:

α=arctan [w(N/2−1−k)/w(N/2+k)]

It should be appreciated that any window functions w may be employed as long as this TDAC condition is fulfilled.

In the following a cascaded encoder and decoder are described by means of FIG. 2. The time-discrete sampled values x(0) to x (2N−1), which are windowed together by one window, will be selected such by the means 16 from FIG. 1 that the sampled value x(0) and the sampled value x(N−1), i.e. a sampled value from the first quarter of the window and a sampled value from the second quarter of the window, are selected so as to form the vector at the output of the means 16. The intersecting errors schematically represent the lifting multiplications and subsequent roundings of the means 18, 20 and/or 22, 24 and/or 26, 28 so as to obtain the integer window sampled values at the input of the DCT-IV blocks.

When the first vector, as described above, has been processed, a second vector is further selected from the sampled values x(N/2−1) and x(N/2), i.e. again a sampled value from the first quarter of the window and a sampled value from the second quarter of the window, and processed by the algorithm described in FIG. 1. As an analogy to this all the other sampled value pairs from the first and second quarter of the window will be processed. The same processing will be carried out for the third and fourth quarter of the first window. 2N windowed integer sampled values are now present at the output 12, which will now be fed, as is represented in FIG. 2, into a DCT-IV transform. In particular, the integer windowed sampled values of the second and third quarter will be fed into a DCT. The windowed integer sampled values of the first quarter of a window will be processed in a preceding DCT-IV together with the windowed integer sampled values of the fourth quarter of the preceding window. As an analogy to this the fourth quarter of the windowed integer sampled values in FIG. 2 together with the first quarter of the next window will be fed together in a DCT-IV transform. The middle integer DCT-IV transform 32 shown in FIG. 2 now provides N integer spectral values y(0) to y(N−1). These integer spectral values may now be simply subjected to an entropy-encoding without any intermediate quantizing being required, since the inventive windowing and transform provide integer output values.

Figure 2:
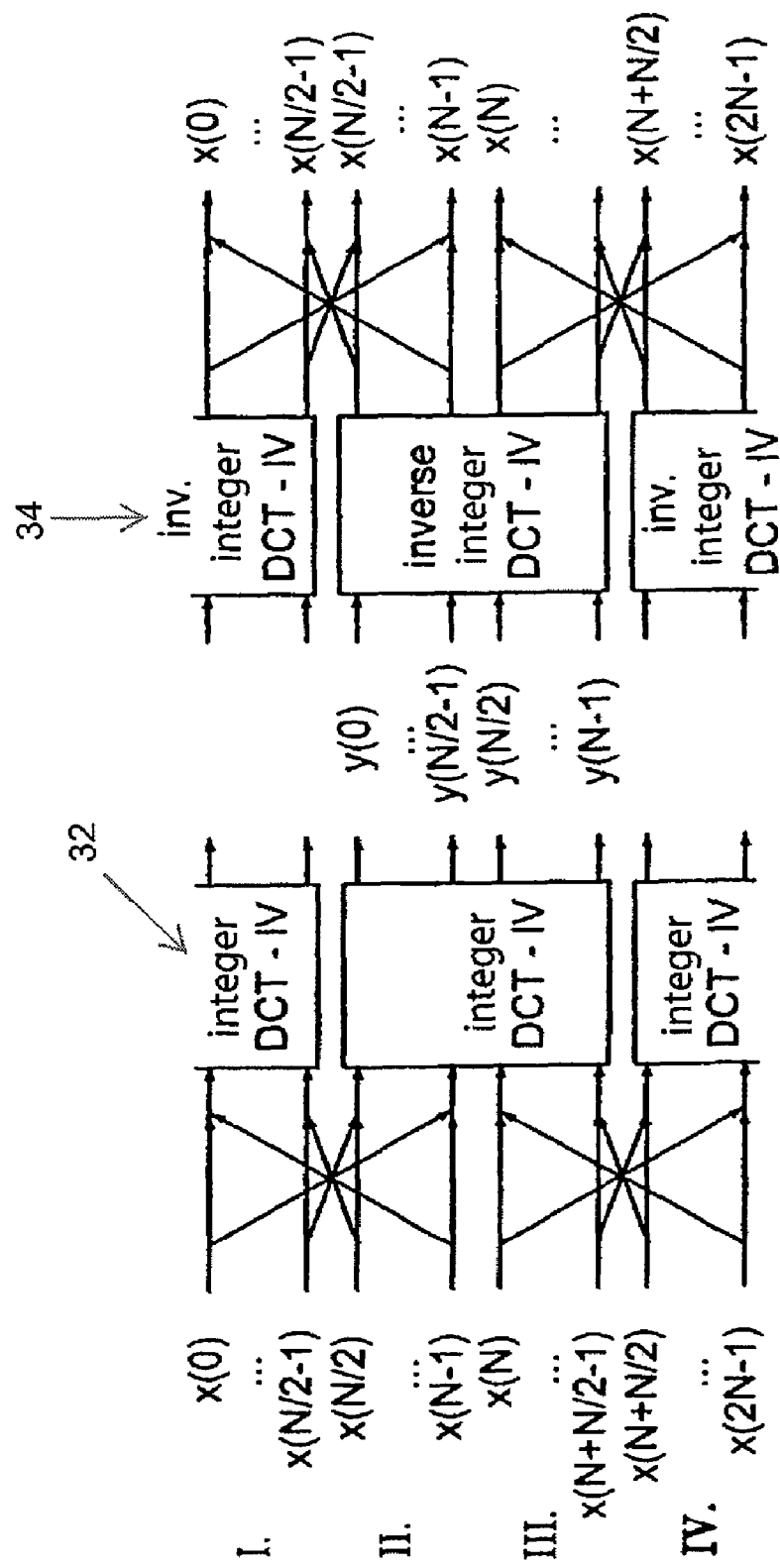
FIG. 2 shows a schematic representation of the decomposition of an MDCT and an inverse MDCT in Givens rotations and two DCT-IV operations in accordance with a preferred embodiment of the present invention.

A decoder is shown in the right half of FIG. 2. The decoder consisting of retransform and inverse windowing works inversely to the encoder. It is known that for inverse transform of a DCT-IV an inverse DCT-IV may be used, as is shown in FIG. 2. The output values of the decoder DCT-IV 34, as is shown in FIG. 2, will now be inversely processed with the corresponding values of the preceding transform and/or the subsequent transform in accordance with the present invention so as to generate, from the integer windowed samples values at the output of the means 34 and/or of the preceding and subsequent transform, time-discrete audio sampled values x(0) to x(2N−1).

The output-side operation inventively takes place by an inverse Givens rotation, i. e. such that the blocks 26, 28 and/or 22, 24 and/or 18, 20 are being passed through in the opposite direction. This should be represented in more detail by means of the second lifting matrix from equation 1. If (in the encoder) the second result vector is formed by multiplication of the rounded first result vector by the second lifting matrix (means 22), the following expression results:

(x, y)→(x, y+x sin α)

The values x, y on the right side of the above equation are integers. This, however, does not apply to the value sin α. Here, the rounding function r has to be introduced as is the case in the following equation:

(x, y)→(x, y+r (x sin α))

Means 24 carries out this operation.
The inverse mapping (in the decoder) is defined as follows:

(x', y')→(x', y'−r (x sin α))

From the minus sign in front of the rounding operation it is obvious that the integer approximation of the lifting step may be reversed without any error being introduced. Applying this approximation on each of the three lifting steps results in an integer approximation of the Givens rotation. The rounded rotation (in the encoder) may be inverted (in a decoder), without introducing an error, namely by passing through the inverse rounded lifting steps in an inverted order, i.e. if the algorithm from FIG. 1 is carried out from the bottom to the top during decoding. If the rounding function r is point-symmetric, the inverse rounded rotation is identical with the rounded rotation with the angle $-\alpha$ and is as follows:

$$\begin{pmatrix} \cos\alpha & \sin\alpha \\ -\sin\alpha & \cos\alpha \end{pmatrix}$$

The lifting matrices for the decoder, i.e. for the inverse Givens rotation, immediately result in this case from the above equation by merely replacing the expression "sin $\alpha$" by the expression "-sin $\alpha$".

Figure 3:
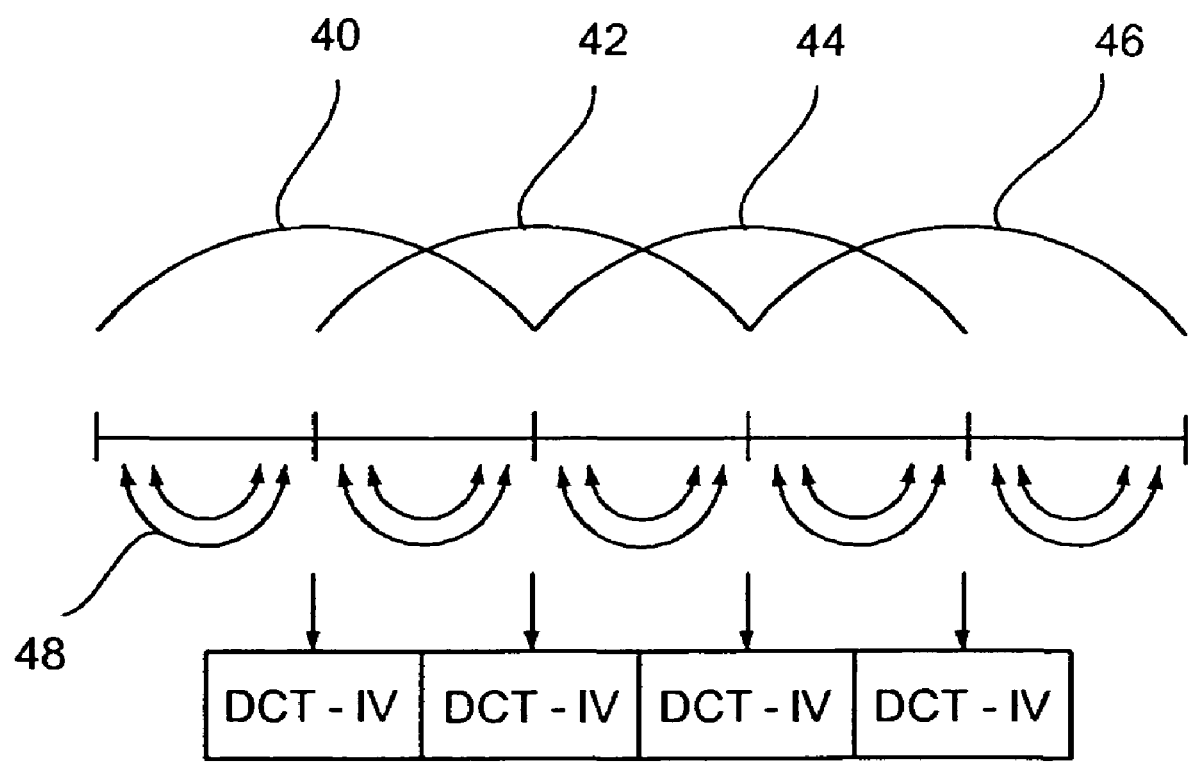
FIG. 3 shows a representation for illustrating the decomposition of the MDCT with a 50% overlapping in rotations and DCT-IV operations.

In the following the decomposition of a common MDCT with overlapping windows 42 to 46 is once more shown by means of FIG. 3. The windows 40 to 46 each have an overlapping of 50%. Per window, Givens rotations are at first carried out within the first and the second quarter of a window and/or within the third and fourth quarter of a window, as is schematically represented by the arrows 48. Then, the rotating value, i.e. the windowed integer sampled values, will be fed into an N-to-N-DCT such that the second and the third quarter of a window and/or the fourth and the first quarter of a subsequent window will always be implemented together by means of a DCT-IV algorithm in a spectral representation.

In accordance with the invention the usual Givens rotations are decomposed in lifting matrices, which are sequentially carried out, wherein, after each lifting matrix multiplication, a rounding step is carried out such that the floating-point numbers will be rounded immediately after their arising such that, prior to each multiplication of a result vector with a lifting matrix, the result vector only comprises integers.

Thus, the output values always remain integer, wherein it is preferred to use integer input values. This does not represent any constriction, since any PCM sampled values, as are stored in a CD, are integer number values, the value area of which varies depending on the bit-width, i.e. depending on whether the time-discrete digital input values are 16 bit values or 24 bit values. Yet, as has been set forth, the whole process is invertible by carrying out the inverse rotations in an inverse order. In accordance with the invention, an integer approximation of the MDCT exists for the perfect reconstruction, that is a lossless transform.

The inventive transform provides integer output values instead of floating point values. It provides a perfect reconstruction such that no errors will be introduced if a forward and then a backward transform are carried out. In accordance with a preferred embodiment of the present invention the transform is a replacement for the modified discrete cosine transform. Other transform methods may also be carried out on an integer basis as long as a decomposition in rotations and a decomposition of the rotations in lifting steps is possible.

The integer MDCT in accordance with the present invention provides the most favorable properties of the MDCT. It has an overlapping structure, as a result of which a better frequency selectivity than with non-overlapping block transforms may be obtained. On the basis of the TDAC function which has already been considered when windowing prior to the transform, a critical sampling is maintained such that the total number of spectral values representing an audio signal equals the total number of input sampled values.

Compared to another normal MDCT providing the floating point sampled values the inventive integer transform discloses that, as compared to the normal MDCT, the noise is increased only in the spectral area, where there is little signal level, while this noise increase may not be noticed in significant signal levels. For this purpose, the inventive integer processing is suitable for an efficient hardware implementation, since only multiplication steps are used which may easily be decomposed into shift/add steps, which may be easily and quickly implemented on a hardware basis.

The inventive integer transform provides a good spectral representation of the audio signal and yet remains in the area of the integer numbers. If applied to tonal parts of an audio signal, this results in a good energy concentration. Thus, an efficient lossless encoding scheme may be built up by simply cascading the inventive windowing/transform represented in FIG. 1 with an entropy-encoder. Especially, a stacked encoding using escape values, as it is used in MPEG AAC, is favorable for the present invention. It is preferred to scale down all values by a certain power until they fit in a desired code table, and then to additionally encode the left out least significant bits. As compared to the alternative of the using greater code tables, the described alternative is more inexpensive with respect to the storage consumption for storing the code table. A nearly lossless encoder might also be obtained by simply leaving out certain ones of the least significant bits.

In particular for tonal signals an entropy-encoding of the integer spectral values enables a high encoding gain. For transient parts of the signal, the encoding gain is low, namely on the basis of the flat spectrum of the transient signal, i.e. on the basis of a low number of spectral values, which are equal to or almost 0. As is described in J. Herre, J. D. Johnston: "Enhancing the Performance of Perceptual Audio Coders by Using Temporal Noise Shaping (TNS)" 101, AES Convention, Los Angeles, 1996, Preprint 4384, this flatness, however, may be used by using a linear prediction in the frequency domain. An alternative is a prediction with an open loop. Another alternative is the predictor with a closed loop. The first alternative, i.e. the predictor with an open loop, is referred to as a TNS. The quantizing of the prediction results in an adaptation of the resulting quantizing noise to the time structure of the audio signal and prevents pre-echos in psychoacoustic audio-encoding. For a lossless audio-encoding, the second alternative, i.e. with a predictor with a closed loop, is more suitable, since the prediction with a closed loop allows an accurate reconstruction of the input signal. If this technology is applied to an inventively generated spectrum, a rounding step has to be carried out after each step of the prediction filter so as to remain in the range of the integers. By using the inverse filter and the same rounding function, the original spectrum may be accurately reproduced.

In order to utilize the redundancy between two channels for data reduction, a middle-side encoding may be employed on a lossless basis, if a rounded rotation having an angle $\pi/4$ is used. As compared to the alternative of calculating the sum and difference of the left and right channel of a stereo signal, the rounded rotation provides the advantage of energy conservation. Using so-called joint-stereo encoding techniques may be turned on or off for each band, as is carried out in the standard MPEG AAC. Further rotary angles may also be considered so as to be able to reduce a redundancy between two channels in more flexible manner.

What is claimed is:

1. Method for processing time-discrete sampled values representing an audio signal so as to obtain integer values, comprising:

windowing the time-discrete sampled values with a window with a length corresponding to 2N time-discrete sampled values so as to provide windowed time-discrete sampled values for a conversion of the time-discrete sampled values in a spectral representation by means of a transform which may generate N output values from N input values, with the windowing comprising:

selecting a time-discrete sampled value from a quarter of the window and a time-discrete sampled value from another quarter of the window so as to obtain a vector of time-discrete sampled values;

applying a square rotation matrix to the vector, the dimension of which coincides with the dimension of the vector, with the rotation matrix being adapted to be represented by a plurality of lifting matrices, with one lifting matrix only comprising one element which depends on the window and is unequal to 1 or 0, with the sub-step of applying comprising the following sub-steps:

multiplying the vector by a lifting matrix so as to obtain a first result vector;

rounding a component of the first result vector with a rounding function mapping a real number onto an integer number so as to obtain a rounded first result vector;

sequentially carrying out the steps of multiplying and rounding with another lifting matrix until all lifting matrices have been processed so as to obtain a rotated vector comprising an integer windowed sampled value from the quarter of the window and an integer windowed sampled value from the other quarter of the window.

2. Method in accordance with claim 1, wherein the lifting matrices are 2 ×2 matrices and where a total of three lifting matrices are available per rotation matrix.

3. Method in accordance with claim 1, wherein the step of multiplying the vector or a rounded result vector is carried out by forming partial products and summing up the partial products, with the step of rounding being carried out with non-integer partial products before being summed up.

4. Method in accordance with claim 1, wherein the window comprises a number of 2N audio sample values which is equal to a power of the basis 2.

5. Method in accordance with claim 1, wherein the rotation matrix is a Givens rotation matrix.

6. Method in accordance with claim 1, further comprising:
carrying out the step of windowing for all time-discrete audio sample values of the remaining quarter of the window so as to obtain 2N filtered integer audio sample values; and
converting N windowed integer audio sample values in a spectral representation by an integer DCT for values with the filtered integer audio sample values of the second quarter and the third quarter of the window so as to obtain N integer spectral values.

7. Method in accordance with claim 6, wherein the integer DCT is a DCT comprising non-symmetric basis functions.

8. Method in accordance with claim 7, wherein the DCT is a type-IV-DCT.

9. Method in accordance with claim 6, wherein the DCT is adapted to be decomposed into Givens rotation matrices and the same are again decomposable into lifting matrices, wherein, after each multiplication with a lifting matrix, a rounding step is carried out.

10. Method in accordance with claim 6, further comprising:
entropy-encoding of the integer spectral values so as to obtain an entropy-encoded version of the audio signal.

11. Method in accordance with claim 6, further comprising the step of quantizing the integer spectral values considering the psychoacoustic masking threshold so as to obtain quantized spectral values which are quantized such that the quantizing noise has been essentially masked.

12. Method in accordance with claim 6, further comprising the step of filtering the integer spectral values over the frequency by means of a predictor with a closed loop and the step of rounding of prediction errors.

13. Method in accordance with claim 1, wherein the Givens rotation matrix has the following shape:

$$\begin{pmatrix} \cos\alpha & \sin\alpha \\ -\sin\alpha & \cos\alpha \end{pmatrix}$$

wherein the lifting matrices comprise the following shape:

$$\begin{pmatrix} \cos\alpha & -\sin\alpha \\ \sin\alpha & \cos\alpha \end{pmatrix} = \begin{pmatrix} 1 & \frac{\cos\alpha-1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha-1}{\sin\alpha} \\ 0 & 1 \end{pmatrix}$$

wherein the angle $\alpha$ is defined as follows:

$$\alpha = \arctan[w(N/2-1-k)/w(N/2+k)]$$

with k being a time index of the time-discrete audio sample values and running from 0 to 2N-1 and with w being a window function.

14. Method in accordance with claim 1, wherein the following condition is fulfilled for the window function w:

$$w\left(\frac{N}{2}+k\right)^2 + w\left(\frac{N}{2}-1-k\right)^2 = 1.$$

15. Method in accordance with claim 14, wherein the window is a sine window.

16. Method in accordance with claim 1, wherein the time-discrete audio sample values are integers.

17. Method for inverse processing of audio integer values, comprising:
applying a rotated vector with a rotation matrix inverse to a rotation matrix used when generating the audio integer values, with the inverse rotation matrix being adjusted to be represented by a plurality of inverse lifting matrices, with an inverse lifting matrix only comprising one element depending on the window and being unequal to 1 or 0, the step of applying comprising:
multiplying the rotated vector with an inverse lifting matrix being inverse to a lifting matrix which has been used when generating the integer values so as to obtain a first inverse result vector;
rounding a component of the first inverse result vector with a rounding function so as to obtain a rounded first inverse result vector; and
sequentially carrying out the steps of multiplying and rounding with further lifting matrices in an order which is inversed with respect to an order when generating the integer values so as to obtain an inversely processed vector which includes an integer time-discrete audio sample value from a quarter of the window and an integer time-discrete audio sample value from another quarter of the window.

18. Method in accordance with claim 17, wherein the lifting matrices are 2×2 matrices and wherein a total of three lifting matrices are available per rotation matrix and wherein the audio integer values include integer spectral values and wherein, prior to the step of applying the rotated vector, the following step is carried out:

converting the audio integer spectral values by an integer DCT inverse to the integer DCT into a time representation so as to obtain the rotated vector.

19. Method in accordance with claim 18, wherein the integer DCT is a DCT derived from the DCT of the type IV.

20. Method in accordance with claim 17, wherein the rounding function is point-symmetric and wherein the inverse lifting matrices are identical to the lifting matrices, but with a negative rotary angle.

21. Method in accordance with claim 17, wherein the inverse lifting matrices are identical to the corresponding lifting matrices, however, apart from subsidiary diagonal elements which are, in the inverse lifting matrices, negative as compared to the lifting matrices.

22. The method in accordance with claim 17, in which the audio integer values are generated from time-discrete audio sample values representing an audio signal, by windowing the time-discrete audio sample values with a window with a length corresponding to 2N time-discrete sample values so as to provide windowed time-discrete audio sample values for a conversion of the time-discrete sample values in a spectral representation by means of a transform which may generate N output values from N input values, with the windowing comprising the following sub-steps: selecting a time-discrete audio sample value from a quarter of the window and a time-discrete audio sample value from another quarter of the window so as to obtain a vector of time-discrete audio sample values; applying a square rotation matrix to the vector, the dimension of which coincides with the dimension of the vector, with the rotation matrix being adapted to be represented by a plurality of lifting matrices, with one lifting matrix only comprising one element which depends on the window and is unequal to 1 or 0, with the sub-step of applying comprising the following sub- steps: multiplying the vector by a lifting matrix so as to obtain a first result vector; rounding a component of the first result vector with a rounding function mapping a real number onto an integer number so as to obtain a rounded first result vector; sequentially carrying out the steps of multiplying and rounding with another lifting matrix until all lifting matrices have been processed so as to obtain a rotated vector comprising an integer windowed audio sample value from the quarter of the window and an integer windowed audio sample value from the other quarter of the window.

23. Apparatus for processing time-discrete audio sample values representing an audio signal so as to obtain integer values, comprising:

a windower for windowing the time-discrete audio sample values with a window (w) having a length corresponding to two 2N time-discrete sample values so as to provide windowed time-discrete audio sample values for a conversion of the time-discrete audio sample values in a spectral representation by means of a transform which may generate N output values from N input values, with the means for windowing comprising:

a selector for selecting a time-discrete audio sample value from a quarter of the window and a time-discrete audio sample value from another quarter of the window so as to obtain a vector of time- discrete audio sample values;

a processor for applying a square rotation matrix to the vector, the dimension of which coincides with the dimension of the vector, with the rotation matrix being adjusted to be represented by a plurality of lifting matrices, with one lifting matrix only comprising one element which depends on the window and is unequal to 1 or 0, the processor for applying comprising:

a multiplier for multiplying the vector by a lifting matrix so as to obtain a first result vector;

a rounder for rounding a component of the first result vector with a rounding function mapping a real number to an integer number so as to obtain a rounded first result vector; and a controller for sequentially carrying out the steps of multiplying and rounding with another lifting matrix until all lifting matrices have been processed so as to obtain a rotated vector comprising an integer windowed audio sample value from the quarter of the window and an integer windowed audio sample value from another quarter of the window.

24. Apparatus for inverse processing of audio integer values, comprising:

a processor for applying a rotated vector with a rotation matrix inverse to a rotation matrix used when generating the audio integer values, with the inverse rotation matrix being adjusted to be represented by a plurality of inverse lifting matrices, with one inverse lifting matrix only comprising one element depending on the window and being unequal to 1 or 0, the processor for applying comprising:

a multiplier for multiplying the rotated vector by an inverse lifting matrix being inverse to a lifting matrix which has been used when generating the integer values so as to obtain a first inverse result vector a rounder for rounding a component of the first inverse result vector with a rounding function so as to obtain a rounded first inverse result vector; and a controller for sequentially carrying out the multiplying and rounding with further lifting matrices in an order which is inverse with respect to an order when generating the integer values so as to obtain an inversely processed vector which includes an integer time-discrete audio sample value from a quarter of the window and an integer time-discrete audio sample value from another quarter of the window.

25. The apparatus in accordance with claim 24, in which the audio integer values are generated from time-discrete sample values representing an audio signal, by windowing the time-discrete sample values with a window with a length corresponding to 2N time-discrete audio sample values so as to provide windowed time-discrete audio sample values for a conversion of the time-discrete audio sample values in a spectral representation by means of a transform which may generate N output values from N input values, with the windowing comprising the following sub-steps: selecting a time-discrete audio sample value from a quarter of the window and a time-discrete audio sample value from another quarter of the window so as to obtain a vector of time-discrete audio sample values; applying a square rotation matrix to the vector, the dimension of which coincides with the dimension of the vector, with the rotation matrix being adapted to be represented by a plurality of lifting matrices, with one lifting matrix only comprising one element which depends on the window and is unequal to 1 or 0, with the sub-step of applying comprising the following sub- steps: multiplying the vector by a lifting matrix so as to obtain a first result vector; rounding a component of the first result vector with a rounding function mapping a real number onto an integer number so as to obtain a rounded first result vector; sequentially carrying out the steps of multiplying and rounding with another lifting matrix until all lifting matrices have been processed so as to obtain a rotated vector comprising an integer windowed sample value from the quarter of the window and an integer windowed sample value from the other quarter of the window.

* * * * *

UNITED STATES PATENT AND TRADEMARK OFFICE
CERTIFICATE OF CORRECTION

PATENT NO. : 7,512,539 B2  Page 1 of 1
APPLICATION NO. : 10/479398
DATED : March 31, 2009
INVENTOR(S) : Ralf Geiger et al.

It is certified that error appears in the above-identified patent and that said Letters Patent is hereby corrected as shown below:

On title page:

Item (54) "Method and Device for Processing Time-Discrete Audio Sampled Values" should be changed to -- "Method and Apparatus for Processing Time-Discrete Audio Sampled Values"

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,512,539 B2  Page 1 of 1
APPLICATION NO. : 10/479398
DATED : March 31, 2009
INVENTOR(S) : Ralf Geiger et al.

It is certified that error appears in the above-identified patent and that said Letters Patent is hereby corrected as shown below:

On title page, Item (54) and at Column 1, lines 1 and 2, title, "Method and Device for Processing Time-Discrete Audio Sampled Values" should be changed to -- "Method and Apparatus for Processing Time-Discrete Audio Sampled Values"

This certificate supersedes the Certificate of Correction issued February 16, 2010.

Signed and Sealed this

Twenty-third Day of March, 2010

David J. Kappos
*Director of the United States Patent and Trademark Office*